United States Patent [19]

Ryan

[11] Patent Number: 5,009,036
[45] Date of Patent: Apr. 23, 1991

[54] BOX CAR DOOR SEAL

[75] Inventor: Walter S. Ryan, Mercer, Pa.

[73] Assignee: Pennsylvania Rail Car Company, Mercer, Pa.

[21] Appl. No.: 522,214

[22] Filed: May 11, 1990

Related U.S. Application Data

[63] Continuation-in-part of Ser. No. 410,273, Sep. 21, 1989, abandoned.

[51] Int. Cl.$^5$ .............................................. E06B 7/23
[52] U.S. Cl. .......................................... 49/485; 49/489
[58] Field of Search .................. 49/485, 489, 493, 494

[56] References Cited

U.S. PATENT DOCUMENTS

| | | | |
|---|---|---|---|
| 2,528,264 | 10/1950 | Coppock et al. | 49/489 |
| 2,593,305 | 4/1952 | Hunter . | |
| 2,718,677 | 9/1955 | Cornell | 49/489 X |
| 3,068,045 | 12/1962 | Komenda | 49/489 |
| 3,083,048 | 3/1963 | Kramer . | |
| 3,284,957 | 11/1966 | Landis . | |
| 3,363,364 | 1/1968 | Cadiou . | |
| 3,371,445 | 3/1968 | Herr et al. | 49/485 X |
| 3,452,481 | 7/1969 | Bailey | 49/485 |
| 3,685,206 | 8/1972 | Kessler | 49/489 |
| 3,927,493 | 12/1975 | Tsuneiski et al. . | |
| 4,157,634 | 6/1979 | Caulston . | |
| 4,312,153 | 1/1982 | Parkinson et al. . | |

FOREIGN PATENT DOCUMENTS 356585  8/1961  Switzerland ........................ 49/485

Primary Examiner—Rodney M. Lindsey
Assistant Examiner—Jerry Redman
Attorney, Agent, or Firm—Harpman & Harpman

[57] ABSTRACT

A box car door seal particularly suited for use on new or reconditioned plug style box car doors having out-turned flanges on their outer edges positions an improved elongated flexible resilient gasket for engagement with a sealing surface of a door frame. The elongated flexible gasket takes the form of an elongated flange with a wide base, the flange extending outwardly from the abase in a tapered configuration of a length at least two times the width of the base so as to be able to sealingly engage the sealing surface of the door frame when the box car door is in closed relation thereto and whether or not the box car door is in its normal shape and spaced relation to the door frame or sprung and spaced irregularly with respect to the door frame and particularly outwardly therefrom.

1 Claim, 1 Drawing Sheet

BOX CAR DOOR SEAL

This is a continuation-in-part of application Ser. No. 07/410,273, filed Sept. 21, 1989 and abandoned on 9/10/90.

BACKGROUND OF THE INVENTION

1. Technical Field

This invention relates to railway box car door seals of the type normally employed to provide a seal between a box car door and a box car door frame.

2. Description of the Prior Art

Prior devices of this type usually comprise "O"-type rubber gaskets affixed to the box car door for engagement with a sealing surface of a box car door frame such as for example seen in U.S. Pat. No. 3,452,481 to Bailey.

The sealing gasket of U.S. Pat. No. 3,452,481 forms an O-ringtype seal having a circular gasket and a metal channel completing the circular configuration by which the seal is mounted to an outwardly extending flange on a door of a box car. The door frame or door jamb of the construction requires a bead positioned in a groove therein for registry with the O-ring sealing gasket and little or no tolerance between the sealing members is possible which results in a misalignment or sprung door failing to provide an effective seal with respect to the door frame or door jamb.

The present invention eliminates the problems of the prior art devices which require considerably more complicated devices to obtain a less than satisfactory result.

SUMMARY OF THE INVENTION

A box car door seal comprises a continuous flexible resilient gasket having a bifurcated base forming oppositely disposed short flanges with longitudinally extending spaced areas of increased flexibility formed by a bore flexibly supporting a laterally extending elongated flange forming a sealing member, the elongated flange being tapered from its thickest portion adjacent the flexible base to its substantially thinner outer edge, said tapered flange being of a width at least two times the width of the base with the base being secured in a relatively flat channel having inturned longitudinal edges engaging the short flanges of the base. The channel provides a simple and inexpensive means of mounting the door seal on a box car door where the laterally extending elongated tapered flange provides a positive seal with a sealing surface of a door frame or the like despite irregularities in the shape and/or space of the door and door frame.

DESCRIPTION OF THE PREFERRED EMBODIMENT

Figure 1:
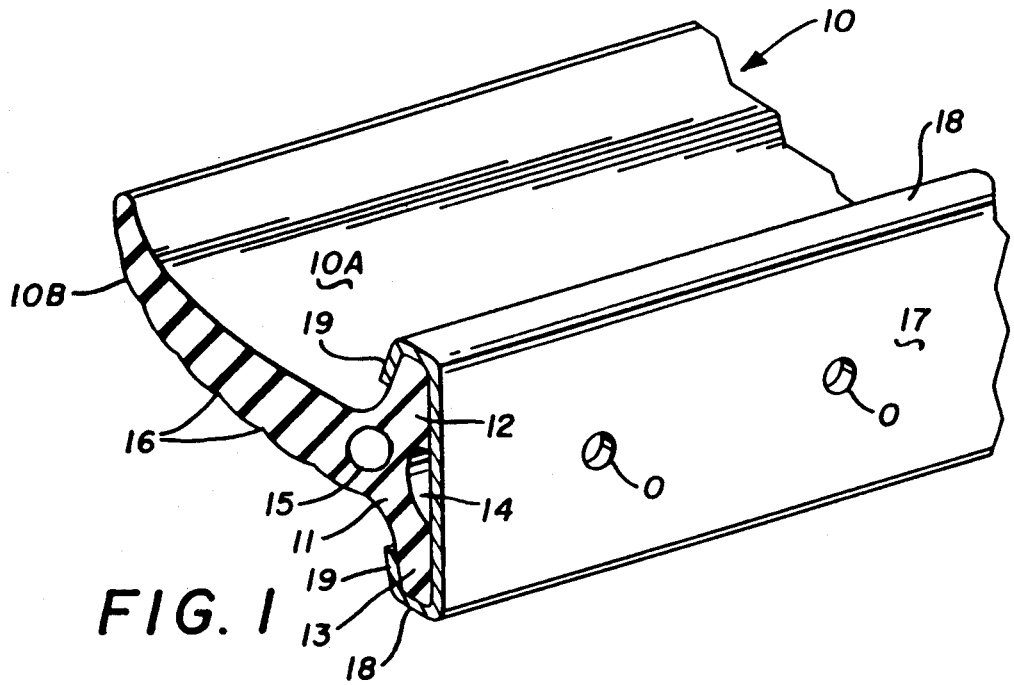
FIG. 1 is a perspective elevation of a section of the box car door seal.

In the simplest form the box car door seal comprises a continuous elongated flexible resilient sealing member 10 having a bifurcated base 11 defining a pair of oppositely disposed short flanges 12 and 13 respectively substantially separated from one another by a longitudinally extending cavity 14 and a longitudinally extending cross sectionally circular bore 15. The bore 15 forms spaced longitudinally extending deformable areas of increased flexibility supporting said elongated flexible resilient sealing member 10. The continuous elongated flexible resilient seal 10 extends laterally from the spaced areas of increased flexibility in a flattened curve and is preferably formed with its uppermost surface 10A smooth and its lowermost surface 10B provided with a plurality of spaced longitudinally extending very shallow grooves 16.

As best illustrated in FIG. 1 of the drawings, the continuous elongated flexible deformable sealing member 10 is preferably of a length at least two times the known width of the bifurcated base 11, for example 2", and not as thick as the base 11.

The bifurcated base 11 is mounted in a channel 17 which has a flat base surface and a pair of oppositely disposed outturned flanges 18, the longitudinal edges of which are inturned at 19 and engaged over the oppositely disposed short flanges 12 and 13 of the bifurcated base of the sealing member 10. Openings 0 may be provided in the base of the channel 17 to facilitate fastening the same to an outturned flange or the like on a box car door. The box car door seal is formed of an elastomer, such as rubber or a comparable synthetic resin, in either event formed of a compound that remains flexible and resilient at low temperatures. The sealing member 10 tapers to a thin free end. It will be seen that the longitudinally extending cross sectionally circular bore 15 is positioned in the sealing member 10 where said bifurcation occurs and that it is spaced from the longitudinally extending cavity 14, said bore 15 being sized so that the remaining parts of the sealing member on either side of the bore 15 are relatively thin and flexible so that they can flex and stretch whereby the sealing member is capable of unusual flexibility enabling it to maintain a flush sealing surface with the sealing flange of the box car door.

A typical example of the invention is represented by the continuous elongated flexible deformable sealing member 10 having a width of about 3" with its bifurcated base having a width of about 1⅛" and the thickness of the sealing member 10 at its point of bifurcation being about ⅛" and the diameter of the longitudinal bore being about ⅛" with the thickness of the material of the sealing member 10 at its point of bifurcation on either side of the bore 15 being about ⅛" and the material between the longitudinally extending bore 15 and the innermost surface of the longitudinally extending cavity being no more than ⅛" whereby the continuous elongated flexible deformable sealing member 10 is provided with relatively thin wall support with respect to its bifurcated base enabling it to maintain its desirable resiliency as necessary to effect a water-tight seal while at the same time being a great deal more flexible at its point of bifurcation.

Figure 2:
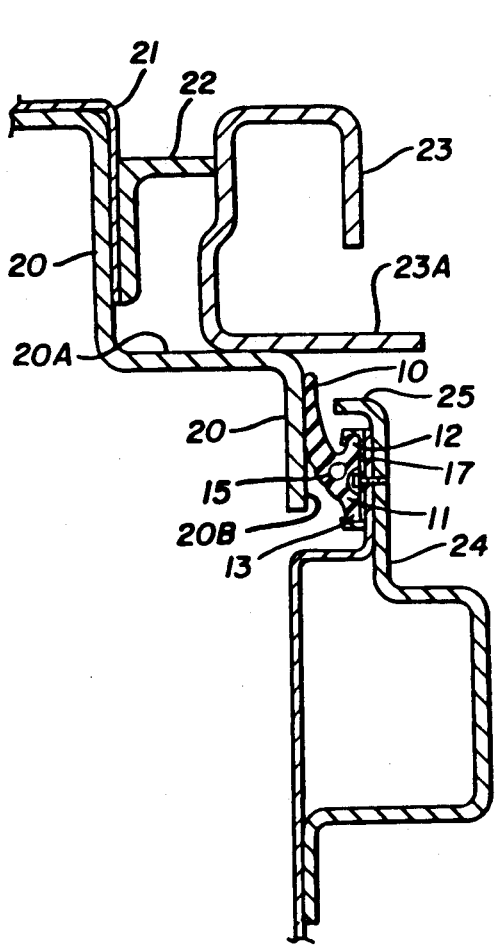
FIG. 2 is a diagrammatic cross section of a box car door frame and a normally positioned door with the sealing member positioned therebetween in sealing relation.

By referring now to FIG. 2 of the drawings, a diagrammatic cross sectional illustration of a railroad box car construction will be seen in the upper part of FIG. 2 as comprising a frame member 20 having a pair of vertical sections and a horizontal section therebetween. A section of sheet material 21 is positioned over the framing member 20 and a secondary frame 22 of a right angular cross section is attached thereto and supports a top door retainer 23 which includes a horizontal section 23A which extends outwardly with respect to a sealing surface 20B of the frame member 20.

Still referring to FIG. 2 of the drawings, it will be seen that the uppermost portion of a box car plug style door construction has been illustrated and includes a door construction member 24 which is positioned vertically in spaced relation outwardly of the lower vertical portion of the frame member 20 of the railroad box car construction with the upper end of the door construction member 24 preferably inturned as at 25. The box car door seal as hereinbefore described in connection with FIG. 1 of the drawings, is affixed to the inner surface of the door construction member 24 by fasteners engaging the openings 0 in the channel 17 in which the continuous elongated flexible resilient sealing member 10 is positioned so that it is located in the space between the lower vertical portion of the frame member 20 of the railroad box car construction and the vertical upstanding portion 24 of the door construction member and below the inturned flange 25 thereof.

In FIG. 2 of the drawings, the diagrammatic representation of the box car plug style door is shown in its normal shape with a predetermined fixed space between the lower vertical portion of the frame member 20 of the railroad box car construction and the upstanding or outturned flange comprising the door construction member 24 and it will be seen that the continuous elongated flexible resilient sealing member 10 is engaged against the sealing surface 20B over a substantial portion of its length so that its uppermost thin tapered end is positioned relatively close to the lower surface of the horizontal portion 23A of the box car door frame retainer 23. In such position it will be observed that rain falling against the box car door construction and the box car door will be largely directed downwardly and outwardly by the described construction and that such rain as does enter the area of the box car door seal will flow therealong to the opposite ends thereof and at no time be able to form a pool deep enough to overflow the upturned end of the box car door sealing member 10.

By referring now to FIG. 3 of the drawings, substantially the same construction hereinbefore described in connection with FIG. 2 may be seen including the railroad box car door construction parts and a portion of the box car plug style door and the latter is illustrated as having been damaged or sprung or otherwise subjected to forces which have changed its shape and its relative spacing with respect to the sealing surface 20B on the lower vertical portion of the frame member 20 of railroad box car construction.

Figure 3:
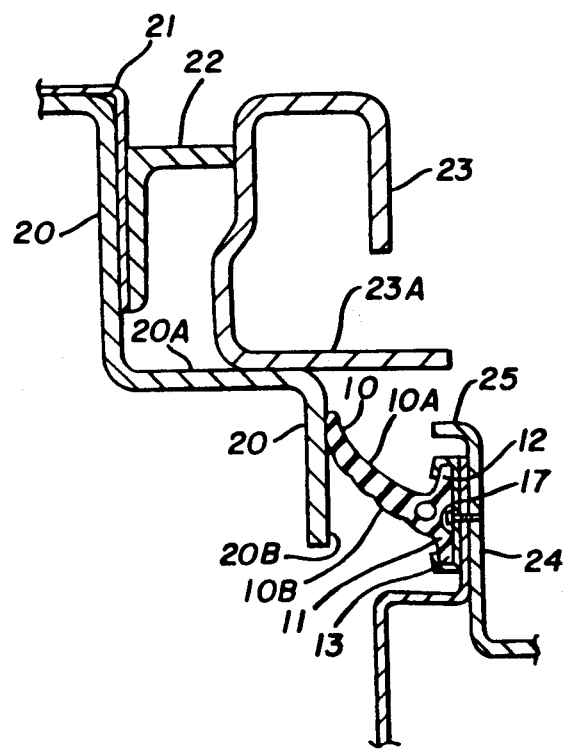
FIG. 3 is a diagrammatic cross section of a box car door frame and a portion of a box car door sprung in relation thereto and illustrating the door seal in sealing relation therebetween.

Still referring to FIG. 3 it will be seen that due to the sprung outwardly spaced position of the upper portion of the box car door construction member 24, the continuous elongated flexible resilient sealing member 10 has partially straightened and due to its length and its flexible resilient qualities with respect to its base 11, it still maintains a sealing relation to the sealing surface 20B of the railroad box car construction frame member 20, the shallow grooves 16 forming several sealing surfaces therebetween.

Those skilled in the art will observe that the relative size and length of the continuous elongated flexible resilient sealing member 10 which has been termed a shark tooth gasket application in the trade can be formed in various lengths and tapering thicknesses with or without the plurality of very shallow grooves 16 in its lower surface and that when positioned on the new or reconditioned plug style box car doors will maintain a highly desirable air and water-tight seal regardless of the condition of the box car door retainer frame and/or the outturned flange forming the door construction member 24 as heretofore described.

It will thus be seen that a substantially improved box car door seal has been disclosed which can be applied to new plug style box car doors or used to replace the "O"-type rubber gaskets on new or reconditioned box car doors and that no additional modifications are required to the door or the sealing surface defined by the appropriate portion of the box car construction.

It will be seen that the device of the invention provides additional sealing capability when the door is sprung at the top sealing surface or if the door is not closed properly and that it also provides additional sealing if the car's sealing surface has been bent or has sustained damage as occurs from fork lift operation therethrough and that in addition to the above advantages, it always provides a water trough across the top of the door to help channel water away from the sealing surface.

Although but one embodiment of the present invention has been illustrated and described, it will be apparent to those skilled in the art that various changes and modifications may be made therein without departing from the spirit of the invention and having thus described my invention what I claim is:

I claim:

1. In the combination of a box car construction having a door frame including a vertically disposed sealing surface, a box car door having a vertical flange spaced with respect to said vertically disposed sealing surface of said box car door frame, the box car construction having a normal condition in which the door frame vertically disposed sealing surface is spaced from the box car door by a preset distance and a sprung condition in which the door frame vertically disposed sealing surface is spaced from the box car door by a distance which differs from the preset distance, and an improved sealing device for sealing the space between the vertical sealing surface of said box car door frame and said flange of said box car door, the improvement comprising: an elongated deformable resilient sealing member, a bifurcated base section of a known width on one longitudinal edge of said elongated sealing member forming oppositely disposed extending flanges on said sealing member, a continuous elongated cavity in said base section partially separating said flanges, a longitudinally extending bore in said sealing member at the point of bifurcation partially separating said flanges, means mounting said sealing member on said flange of said box car door with said elongated deformable resilient sealing member in engagement with said vertical sealing surface of said door frame, said sealing member extending outwardly and upwardly from said bore in a shallow curve and having a convex surface which contacts said vertically disposed sealing surface and forms a fluid tight seal, a substantial portion of said sealing member convex surface engaging said vertical sealing surface of said door frame when said box car construction is in the normal condition, said sealing member having a concave surface which defines a trough for directing liquid away from said vertical flange of said door frame, said longitudinally extending bore being sized so that there is only enough material in said deformable resilient sealing member and base surrounding said bore to provide the sealing member with sufficient flexibility to maintain enough of the convex surface in contact with the vertical sealing surface to maintain said fluid tight seal with the vertically disposed flange when the box car construction is in the sprung condition as well as maintaining said convex surface in flush contact with the vertically disposed surface when the box car construction is in the normal condition.

* * * * *